United States Patent [19]

Hehl

[11] 3,935,791

[45] Feb. 3, 1976

[54] HYDRAULIC DRIVE FOR THE DIE CLOSING UNIT OF AN INJECTION MOLDING MACHINE

[76] Inventor: Karl Hehl, Arthur-Hehl-Strasse 32, 7291 Lossburg, Germany

[22] Filed: Jan. 31, 1975

[21] Appl. No.: 546,036

[30] Foreign Application Priority Data
Mar. 27, 1974 Germany............................ 2414668
Apr. 27, 1974 Germany............................ 2419314

[52] U.S. Cl................................. 91/411 R; 92/146
[51] Int. Cl.²........................................ F15B 11/02
[58] Field of Search.......... 91/411 R, 415, 416, 437; 92/146

[56] References Cited
UNITED STATES PATENTS

| 3,340,756 | 9/1967 | Mize | 91/411 R X |
|---|---|---|---|
| 3,663,140 | 5/1972 | Hehl | 425/154 |

*Primary Examiner*—Edgar W. Geoghegan
*Attorney, Agent, or Firm*—Joseph A. Geiger

[57] ABSTRACT

A hydraulic drive for the die closing unit of an injection molding machine in which at least one power cylinder and power piston with a coaxially attached auxiliary cylinder opens and closes the molding die by executing the opening and closing travel with a differential piston action in the power cylinder and/or with the auxiliary cylinder, while valve-closable bypass channels in the power piston are kept open. The closing of these channels switches the drive from an accelerated travel mode to a high-pressure die clamping mode.

An annular valve plunger cooperates with a valve seat on the power piston to open and close the bypass channels, several alternatives of guiding and hydraulically moving the valve plunger being contemplated.

29 Claims, 19 Drawing Figures

HYDRAULIC DRIVE FOR THE DIE CLOSING UNIT OF AN INJECTION MOLDING MACHINE

BACKGROUND OF THE INVENTION

1. Field of the Invention

The present invention relates to injection molding machines, and in particular to hydraulic drive means for the opening and closing of the two halves of a molding die into which plastic or metallic raw material is injected. More specifically, the present invention relates to hydraulic cylinder operated die closing units of injection molding machines in which the cylinder rods extend in the direction of the opening and closing motion of the movable die plate, which latter may be directly attached to the cylinder rods.

2. Description of the Prior Art

A prior art hydraulic drive for a die closing unit of the type mentioned above is disclosed in my U.S. Pat. No. 3,663,140. This drive consists of at least two parallel hydraulic power cylinders to which two auxiliary cylinders are coaxially connected. While a comparatively moderate force is normally sufficient to separate and approach the die halves, a much larger force is required to keep the die closed during the injection process. The known device takes advantage of this difference, by using the smaller auxiliary cylinders to produce the opening and closing travel of the unit, and using the power cylinders only to create the closing pressure. Under certain special circumstances, the power cylinder is also used to assist in the initial portion of the opening motion, when the molded part offers a resistance against die opening.

In the prior art device, this is accomplished by arranging the pistons of the power cylinders so as to operate both as pistons and as bypass valves which, when open, permit the power piston to execute the opening and closing travel, without removing all the fluid from one side of the power cylinder and simultaneously taking in a comparable amount of fluid on the other side of the cylinder. Instead, the hydraulic fluid simply flows through bypass channels arranged inside the power piston from one side of the piston to the other, as a result of the valve action of the piston. At the end of the closing travel, for example, the power piston valve is closed, whereupon the effective area of the power piston, subjected to the full fluid pressure, exerts its maximum force against the die halves as a closing pressure.

In the above-mentioned prior art arrangement, the power piston itself is the moving part of this internal bypass valve. The valve seat is provided in the form of an upstanding radial shoulder on the piston rod, the piston being seated against this shoulder in the closed valve position. This design has certain shortcomings, among them the material and machining costs of the piston rods with their radial shoulders, the manufacturing and assembly costs of the axially movable power pistons with their internal flow chamber and valve closing face. Another disadvantage relates to the considerable weight of the piston which, being the moving valve body, causes the latter to respond comparatively slowly to a reversal of movement direction, and which also creates a rather hard impact, when the power piston moves against its valve seat. Lastly, the entire closing pressure is transmitted from the power piston to the piston rod through the valve seat, meaning that the valve seat has to be comparatively large in area, with the result that the flow through the open valve seat is more restrained and not as straight and even as would be desirable.

SUMMARY OF THE INVENTION

Underlying the present invention is the primary objective of improving upon the above-described prior art die closing unit drive, by eliminating or at least reducing the mentioned shortcomings to the extent that savings are realized in the manufacture and assembly of the parts, while the possibility for operation at considerably higher speeds is afforded through the elimination of the power piston as a moving valve body and the rearrangement of the bypass channels inside the power piston for a fluid flow with a minimum of throttling action and with the least possible change in flow direction.

The present invention proposes to attain the above objective by suggesting a hydraulic drive for the die closing unit of an injection molding machine in which the valve for controlling the bypass flow through the piston of the hydraulic power cylinder is constituted by an hollow valve plunger which is arranged to move axially on the pressure side of the power piston in cooperation with a cylinder surface which concentrically surrounds the piston rod, whereby the power piston itself is fixedly attached to the piston rod and has a valve seat for cooperation with the valve plunger which, when engaged against the seat, closes the bypass channels in the power piston.

The primary advantages resulting from this improvement are: a simplification of the constituent parts which reduces the cost of manufacture, especially in large quantities; a considerable increase in operating speed, due to the greatly reduced weight of the valve plunger, with the additional benefit of greatly reducing the impact forces on the valve seat and hence the contact area on the latter; greater longevity; and improved adaptability of the design to varying design requirements.

BRIEF DESCRIPTION OF THE DRAWINGS

Further special features and advantages of the invention will become apparent from the description following below, when taken together with the accompanying drawings which illustrate, by way of example, several embodiments of the invention, represented in the various figures as follows:

FIGS. 9 and 10 show the piston and valve assembly of FIG. 8 at an enlarged scale, the valve being closed in

3

FIG. 9 and open in FIG. 10;

DESCRIPTION OF THE PREFERRED EMBODIMENTS

Figure 1:
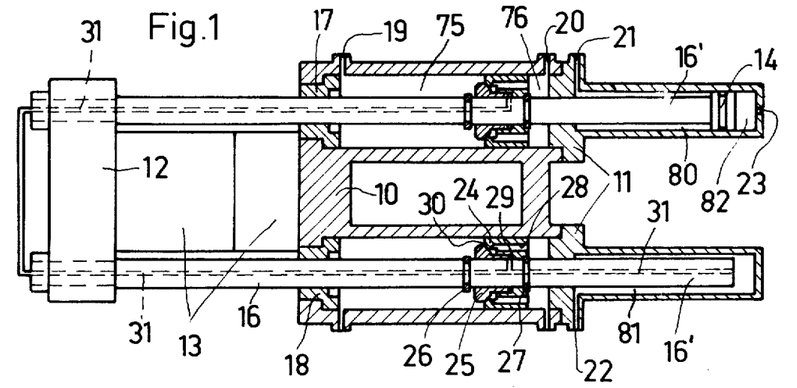
FIG. 1 is a plan view of a die closing unit, shown in partial longitudinal section, with a hydraulic drive embodying the present invention.

A first embodiment of the invention is illustrated in FIG. 1, where a movable die plate 12 carries one half of the injection molding die 13, while the other half is attached to a block-shaped cylinder mount 10 which also serves as a base for the die closing unit. In this cylinder mount are arranged two parallelly spaced cylinder bores defining cylinder pressure spaces 75 and 76 on the front and back of two identical power pistons 24. It should be understood, that the proposed die closing unit may also be equipped with four power cylinders, for example, or, in the case of the push-type unit to be described further below, with only one such power cylinder. The power pistons 24 are attached to piston rods 16 extending axially from the cylinder mount 10 in both directions, the forward extremities of the piston rods 16 carrying the movable die plate 12 with the movable half of the molding die 13. The rearwardly extending piston rod portions 16' extend into two coaxially aligned auxiliary cylinders 11, thereby forming annular cylinder chambers 80 and 81. The longitudinal guidance of the piston rods is obtained by means of guide bores in a pair of guide bushings 17 and 18 arranged in the forward wall of the cylinder mount and by similar guide bores in a pair of suitable connecting flanges of the auxiliary cylinders 11. To the rear extremity of one of the piston rod portions 16' is attached a piston 14.

The cylinder space 75 which is located ahead of the power piston 24, hereinafter referred to as the high pressure space, is connected to the hydraulic system of the injection molding machine via an inlet 19 at the front end of the power cylinder, while a similar inlet 20 at its rear end leads to the rear cylinder space 76, hereinafter referred to as the low pressure space. Hydraulic lines lead from these inlets to the hydraulic controls of the injection molding machine (not shown), which selectively connect one or the other, or both inlets, to a source of pressure fluid, while one or the other inlet may be connected to the fluid tank of the machine. Similar inlets 21 and 22 lead to the cylinder spaces 80 and 81 of the two auxiliary cylinders 11. From FIG. 1 it can readily be seen that a pressurization of the cylinder space 80 of the right-hand auxiliary cylinder - as seen from behind the unit - produces a closing travel of the unit, while pressurization of the cylinder space 81 of the left-hand auxiliary cylinder produces an opening travel of the unit. Both auxiliary cylinders are thus single-acting cylinders, in contrast to the double-acting power cylinders; one auxiliary cylinder serves exclusively as an opening cylinder, while the other serves as a closing cylinder. A bore 23 allows air to enter and exit from the outer extremity of the right-hand auxiliary cylinder.

A central flow channel 31 leads from the cylinder space 81 of the opening auxiliary cylinder to its associated power piston and through a cross connection in the movable die plate 12 from the left-hand piston rod into the right-hand piston rod and to the right-hand power piston. As can better be seen in FIGS. 2 and 3, the central channel 31 opens into an annular valve plunger pressure space 29, located axially between the power piston 24 and a hollow valve plunger 25, which latter is arranged for axial sliding motion on the piston rod 16. While the inner diameter of the valve plunger 25 engages the piston rod 16, a concentric outer diameter thereof engages a matching recessed bore in the power piston 24 so that the valve plunger is not only responsive to the pressure created in the plunger pressure space 29, but also to the pressure to which the high pressure space 75 of the power cylinder is subjected. Suitable gaskets 36 and 37 in the valve plunger 25 and in the piston rod 16, respectively, provide a seal for the inner and outer cylinder surfaces of valve plunger 25.

Figure 2:
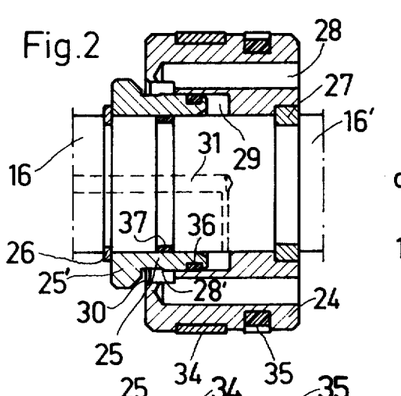
FIGS. 2 and 3 show in an enlarged cross section the power piston and valve assembly of the device FIG. 1, the valve being shown open in FIG. 2, and closed in FIG. 3.

Pressurization of the cylinder space 75 thus causes the valve plunger 25 to move to the right until an enlarged flange portion 25' on the valve plunger 25 comes to axially abut against a matching valve seat 30 of the power piston 24. The latter is mounted on the same diameter of the piston rod 16, being axially restrained against the effect of the hydraulic pressure in the high pressure space 75 by a split abutment ring 27 seated in a groove of the piston rod. If the line 31 and the pressure space 29 are pressurized higher than the pressure which exists inside the cylinder space 75, then the valve plunger 25 moves to the left, away from the valve seat 30, until it is stopped by a retaining ring 26. In this retracted position, the valve plunger 25 opens an axial recess 28' in the power piston 24. The latter in turn is in communication with a series of axially oriented bypass channels 28, which thus connect the low pressure side of the power piston to its high pressure side, when the valve plunger is in the open position (FIG. 2). For a smooth flow path of the hydraulic fluid through the bypass channels 28 and through the valve itself, the valve seat 30 of the power piston and the mating face of the flange portion 25' of the valve plunger are preferably inclined at an angle of approximately 45° against the cylinder axes a—a. The outer diameter of the flange portion 25', which is preferably also the outer diameter of the valve seat 30, is approximately identical to the center circle on which the axes b—b of the bypass channel 28 are located.

The operative sequence of this die closing unit drive, starting from a closed die position and assuming that the molded part is ready for ejection, is as follows:

In order to open the die halves 13, pressurized hydraulic fluid is pumped into the cylinder space 81 of the opening auxiliary cylinder 11, via its intake 22. This pressurization causes the piston rod portion 16' to act itself as a piston, pushing both piston rods, which are rigidly interconnected at the movable die plate 12 to form a moving assembly therewith, to the left in FIG. 1. However, since the valve plunger pressure spaces 29 are hydraulically connected to the cylinder space 81, the pressurization of the latter also causes both valve plungers 25 to move to the left, thereby opening the bypass valves of the two power pistons 24. With the power piston valves thus opened (FIG. 2), the pistons are free to move to the left inside their power cylinders, as the hydraulic fluid simply moves from the high pressure side of the power pistons to their low pressure side, without leaving the cylinder. This produces a rapid opening motion of the die closing unit, while a comparatively small volume of pressure fluid is used, as determined by the diameter of the piston rod portion 16' and the required opening stroke of the molding die 13.

It may be desirable to remove and renew at least a portion of the hydraulic fluid in the power cylinders during each cycle. This is accomplished either through appropriate controls in the hydraulic lines connected to the intake openings 19 and 20, or it may be a built-in feature, if the piston rods 16 have rear piston rod portions 16' which are larger or smaller in diameter than the remainder of the piston rods.

The closing travel is accomplished by means of the closing auxiliary cylinder on the right-hand side of the unit which, when the cylinder space 80 is pressurized, cause the auxiliary piston 14, and with it the entire moving assembly, to move rearwardly, thereby approaching the mold halves 13 against each other. In this case, the valves of the power pistons are again in their open positions (FIG. 2), the hydraulic fluid flowing freely from the low pressure side to the high pressure side of the power pistons 24. In this case, the power piston valve is held open either as a result of an axially fixed connection between the power piston 24 and the piston rod 16, or as a result of a certain residual pressure inside the valve plunger pressure space 29, which latter may be obtained through a throttling action against the hydraulic fluid being expulsed from the cylinder space 81 of the opening auxiliary cylinder. As soon as the die halves 13 are closed against each other, the high pressure spaces 75 of the power cylinders are pressurized. This pressure causes the valve plungers 25 to move to the right, thereby shutting off the bypass flow through the power pistons 25. The latter now become pressurized over their entire area, and the resultant force is transmitted to the piston rods 16 and to the die 13 via the split abutment rings 27 in the piston rods.

Figure 4:
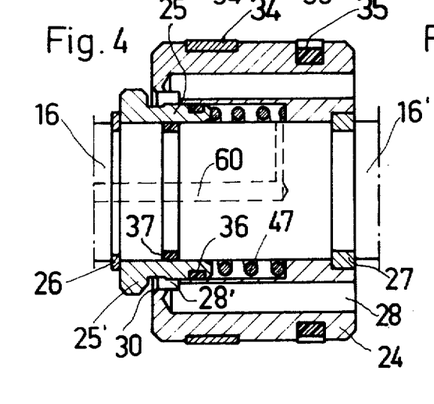
FIGS. 4 and 5 are similar to FIGS. 2 and 3, featuring a modified version of a power piston and valve assembly.
Figure 5:
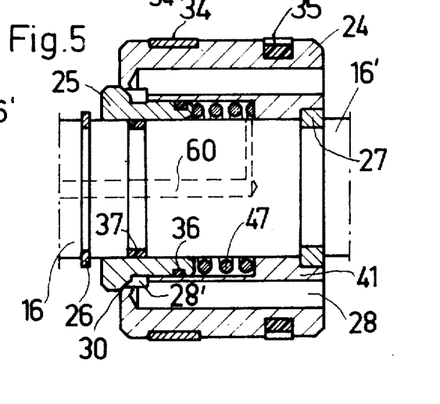

In FIGS. 4 and 5 is illustrated a slightly modified embodiment of the power piston and valve assembly just described. Here, the annular space which previously served as a valve plunger pressure space is elongated in the axial direction, accommodating therein a compression spring 47 which gives the valve plunger 25 a bias toward its open position (FIG. 4). The central bore 60 serves in this case merely as a relief bore for the evacuation and supply of air from and to the annular space occupied by the spring 47. Thus, the valve is automatically maintained open during the closing and opening travels of the guide closing unit, and it is closed only, when the high pressure cylinders space 75 is pressurized, while a certain counter pressure is created in the low pressure space 76. This pressure creates a closing force on the hollow valve plunger 25.

Figure 3:
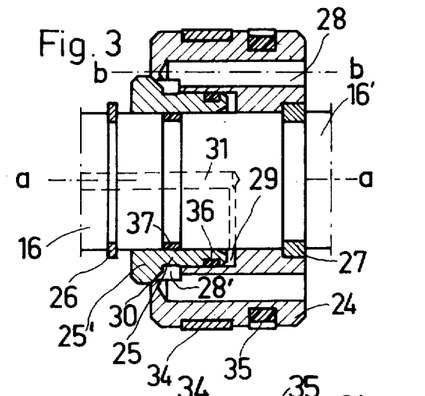

Both the first-described embodiment (FIGS. 1-3) and its modification (FIGS. 4 and 5) have essentially the same hollow valve plunger 25 which is seated for sliding axial motion on the outer diameter of the piston rod 16 and which has an outer cylindrical surface that sealingly engages a recessed bore of the power piston 24. This arrangement renders the valve plunger 25 responsive to the pressure in the high pressure space 75 of the power cylinder, which pressure forces the valve plunger into its closed position. The valve plunger returns to its open position, as soon as the space 75 is de-pressurized, moving either under the action of the spring 47 (FIGS. 4 and 5), or in response to a hydraulic opening pressure reaching the pressure space 29 through line 31 (FIGS. 2 and 3).

Figure 8:
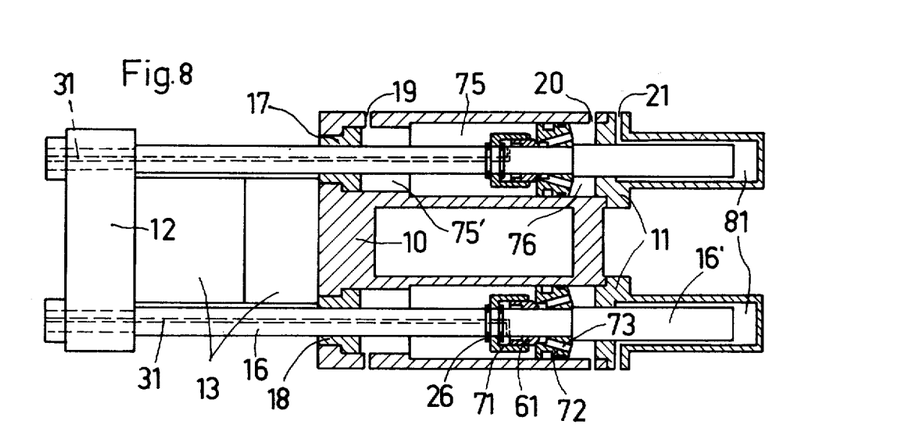
FIG. 8 shows a die closing unit similar to that of FIG. 1, but with a further version of a power piston and valve assembly.
Figure 9:
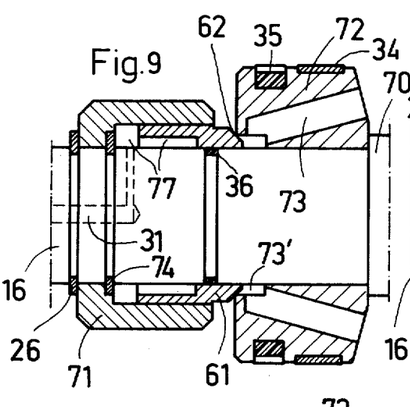
Figure 10:
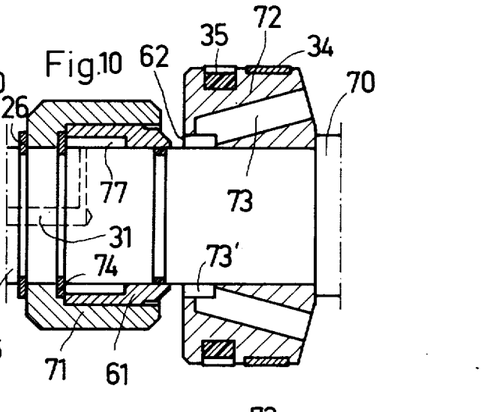

A different operative response is provided in all the other embodiments of the invention, as exemplified by FIGS. 8-12, for example. Here, the annular valve plunger 61 is made responsive to a valve plunger pressure space 77 which is arranged on the opposite axial end of the valve plunger, between the latter and a cylinder sleeve 71. Thus, the valve plunger is urged into its open position (FIG. 10), whenever a pressure exists in either the high pressure space 75 or the low pressure space 76, as long as the valve plunger pressure space 77 and the supply line 31 are not pressurized. As can be seen in FIG. 9, for example, the hollow valve plunger 61 has again a tapered contact face engaging a matching valve seat 62 on the periphery of an axial recess 73' of the power piston 72. However, in this case the valve diameter is slightly smaller than the hydraulically effective outer diameter of the valve plunger 61. Thus, the closing motion of the power piston valve can be controlled and timed independently of the opening and closing travel motions, making it possible to slow down the closing motion just before the die halves 13 meet, by closing the valve slightly before the end of closing travel. Similarly, the full power piston force could be used to initiate the opening travel, by holding the power piston valve closed during an initial pressurization of the low pressure space 76.

Figure 11:
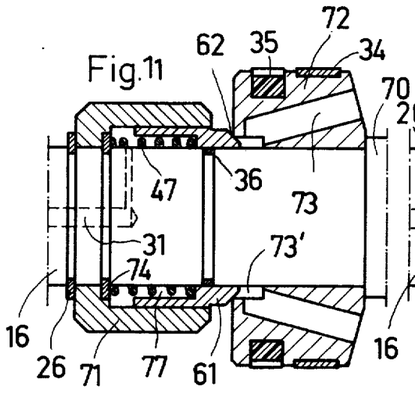
FIGS. 11 and 12 show a small modification of the arrangement of FIGS. 9 and 10.
Figure 12:
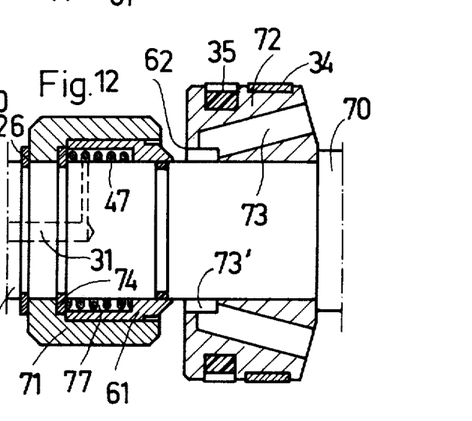

A modified embodiment is again illustrated in FIGS. 11 and 12, where a compression spring 47 is arranged between the cylinder sleeve 75 and the valve plunger 61. In this case, the spring provides a closing bias on the valve plunger 61, which bias adds itself to the closing pressure from the line 31, but which can be overcome, in order to open the valve, when both power cylinder pressure spaces 75 and 76 are under pressure during the opening and closing travels.

It will be noted that the die closing unit of FIG. 8 does not have two different auxiliary cylinders 11 as is the case in the unit if FIG. 1. Here, both auxiliary cylinders operate simultaneously to provide the opening travel only. The closing travel, on the other hand, is obtained through a pressurization of both power cylinder spaces 75 and 76 which, due to different diameters of the piston rod 16 on the front and rear of the power piston 72, produces a differential pressure on the power piston 72 in the sense of a closing motion. As mentioned, this pressure also automatically opens the power piston valve.

Figures 6, 7, 18:
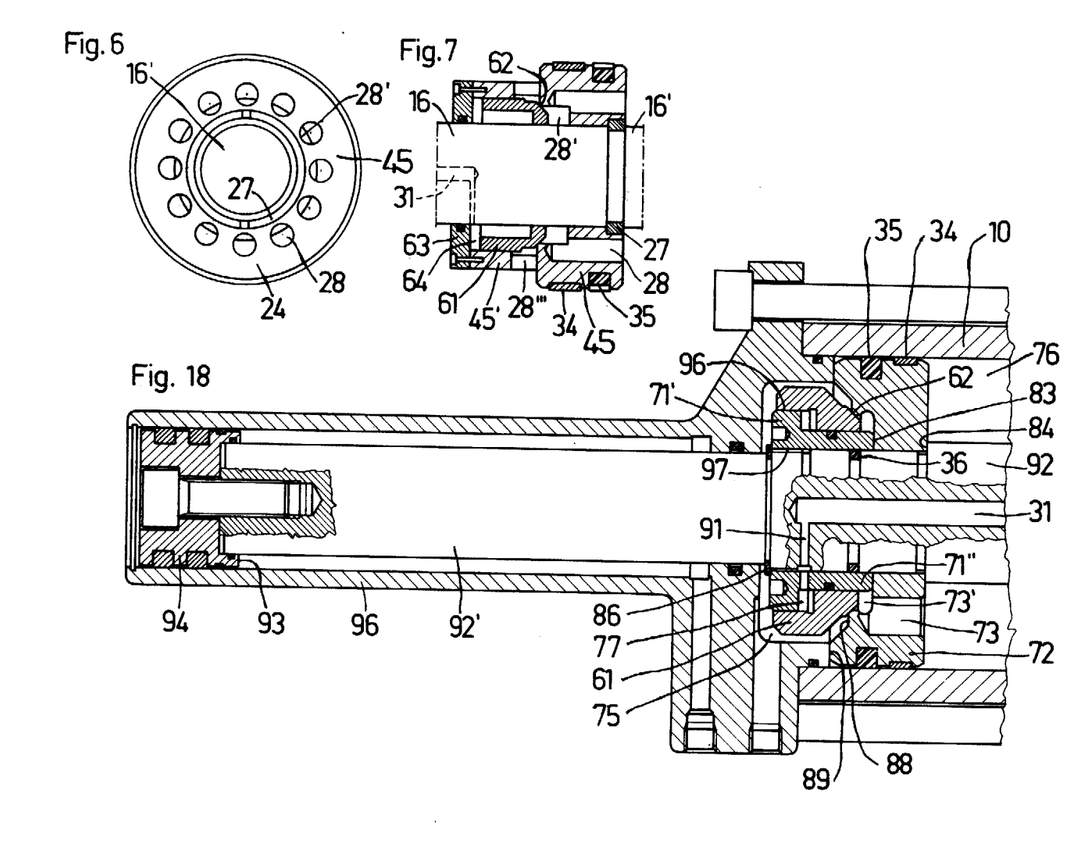
FIG. 6 is a typical end view of a power piston, such as the one of FIG. 7, showing the piston bypass channels as seen from the low pressure side of the piston.
FIG. 7 shows a further embodiment of a power piston and valve assembly according to the present invention.
FIG. 18 shows a portion of a push-type die closing unit, with a power piston and valve assembly representing a still further embodiment of the invention.

A similar, but somewhat modified embodiment is shown in FIGS. 6 and 7, where the cylinder sleeve 71 of the previously described embodiment is replaced by an integral cylinder extension 45' of the power piston 45, the open end of the cylinder extension 45' being closed off by means of an end cover 63, thereby confining the valve plunger 61 inside the power piston 45. A plurality of radial bores 28''' complete the flow path of the fluid through the power piston 45 from the bypass channel 28 and the axial recess 28', when the valve plunger 61 is in its open position. The central channel 31, leading to the valve plunger pressure space 64 inside the cover 63, supplies the pressure which closes the valve, while the pressure inside the power cylinder spaces 75 and 76 causes the valve to open. The operative characteristics of this assembly are thus similar to those of the embodiment described in connection with FIGS. 8–12.

A still further embodiment of the invention is illustrated in FIGS. 13–17. Here, the hollow valve plunger 61 defines a valve configuration with the power piston 72 which is similar to that of the embodiment of FIGS. 8–10 but, instead of being surrounded by a cylinder sleeve 71, the valve plunger 61 encloses a fixed ring 71', in order to form the desired valve plunger pressure space 77. The piston rods 16 are again shown of a uniform diameter over their entire length, rather than with differential diameters as in FIG. 8, which means that the power piston 72 is positioned against the piston rod by means of a split ring 27. It further requires that one of the auxiliary cylinders serves again as a closing cylinder, while the other serves as an opening cylinder.

It will be readily recognized that the operative characteristics of the embodiment of FIGS. 13–17 are quite similar to those of the embodiment of FIGS. 8–12. The major difference between these two embodiments is one of analogous inversion of certain portions of the hollow valve plunger 61 and its cooperating part, which together form the valve plunger pressure space 77. This cooperating part - cylinder sleeve 71 in one case, and ring 71' in the other case - is axially positioned on the piston rod 16 be means of retaining rings 26 and 74. The outer diameter of the valve plunger pressure space 77 is in both cases the same and, because it is larger than the diameter of the valve seat 62, the valve opens under pressurization of the high pressure space 75, unless the valve plunger pressure space 77 is likewise pressurized, in which case the valve plunger closes against the power piston 72. With the exception of the piston rod shoulder 70 of the split ring 27 of this embodiment, the power piston 72 is essentially the same in both cases.

For practical purposes, the radial width of the valve plunger pressure space 77, i.e. the radial step between the inner and outer effective diameters of the valve plunger 61, is preferably approximately between one-eighth and one-sixth of the diameter of the piston rod 16.

Figure 14:
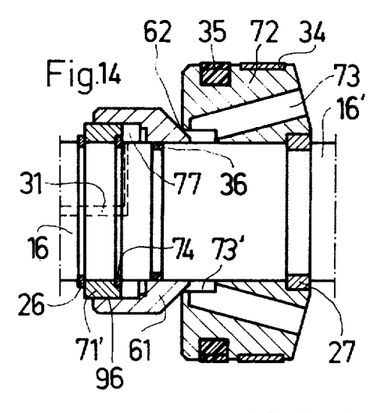
FIGS. 14 and 15 show the main piston and valve assembly of FIG. 13 at an enlarged scale, the valve being closed in FIG. 14 and open in FIG. 15.
Figure 15:
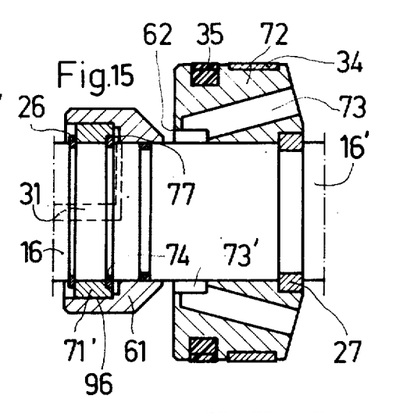
Figure 16:
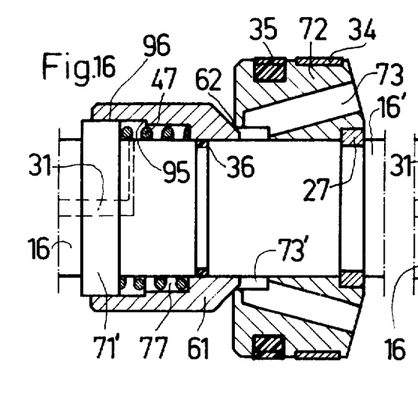
FIGS. 16 and 17 represent a modification of the assembly of FIGS. 14 and 15.
Figure 17:
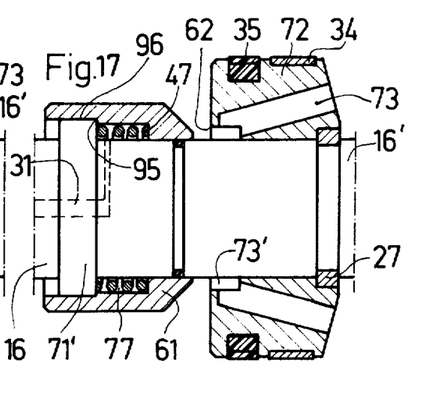

In FIGS. 16 and 17 is again shown a modified version of the embodiment of FIGS. 14 and 15, the closing of the valve plunger 61 being assisted by a compression spring 47. In this case, however, the valve plunger has to be axially longer, in order to accommodate the spring inside an axially extended valve plunger pressure space 77. A small shoulder 95 limits the opening travel of the valve plunger 61 against the fixed ring 71'.

In order to open the molding die 13, the cylinder space 81 of the opening auxiliary cylinder 11 is pressurized via the inlet 21, so that the piston rod portion 16' acts as a piston, pushing the movable assembly into the open position. During this opening travel, the power cylinder spaces 75 and 76 are both pressurized just enough to cause the valve plunger 61 to move against the non-pressurized valve plunger pressure space 77, i.e. to open, so that the power piston 72 can move freely through the pressure fluid contained inside the power cylinder. As can readily be seen from the drawing, the flow path of the fluid to the bypass channels 73 of the power piston 72 has a minimum of directional change.

The closing travel of the movable assembly is achieved by pressurizing the pressure space 80 of the closing auxiliary cylinder 11, via its inlet 22. The auxiliary piston 14, which is attached to the rear extremity of the piston rod portion 16, then causes the movable assembly to travel rearwardly, until the molding die 13 is closed. The valve plunger 61 is again kept open through a slight pressurization of the power cylinder spaces 75 and 76. Upon termination of the closing travel, the valve plunger pressure spaces 77 are pressurized via the fluid channels 31, so that the valve plunger 61 closes the bypass channels 73 of the power piston by contacting its valve seat 62.

As stated earlier, the diameter of the valve plunger pressure space 77 is somewhat larger than the diameter of the valve seat 62 on the edge of the axial recess 73' on the high pressure side of the power piston 72. This difference in diameters signifies that the valve plunger 61 is not only urged into its open position (FIG. 15), as long as it is axially spaced from the valve seat 62, but also when it contacts the latter, because the hydraulically effective area on the valve plunger which is located radially outside the valve seat 62 is larger than the oppositely oriented effective area of the valve plunger which is located radially outside the fixed ring 71'.

Figure 13:
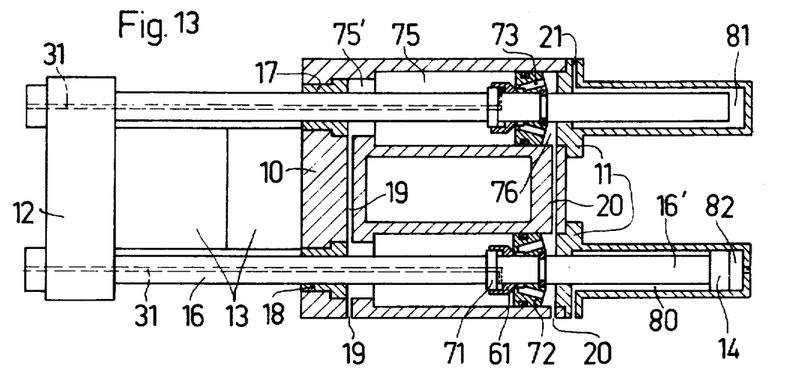
FIG. 13 shows a third embodiment of the die closing unit according to the invention.

As can be seen especially in FIGS. 1, 8 and 13, the three major embodiments of the invention described so far are very similar in regard to their die mounting configurations. In each case the movable die plate is pulled closed, leading to the designation of this type of die closing unit as a "pull-type" die closing unit. This piston rods extend axially past the molding die 13, thereby pulling the movable die plate against the stationary die plate.

Figure 19:
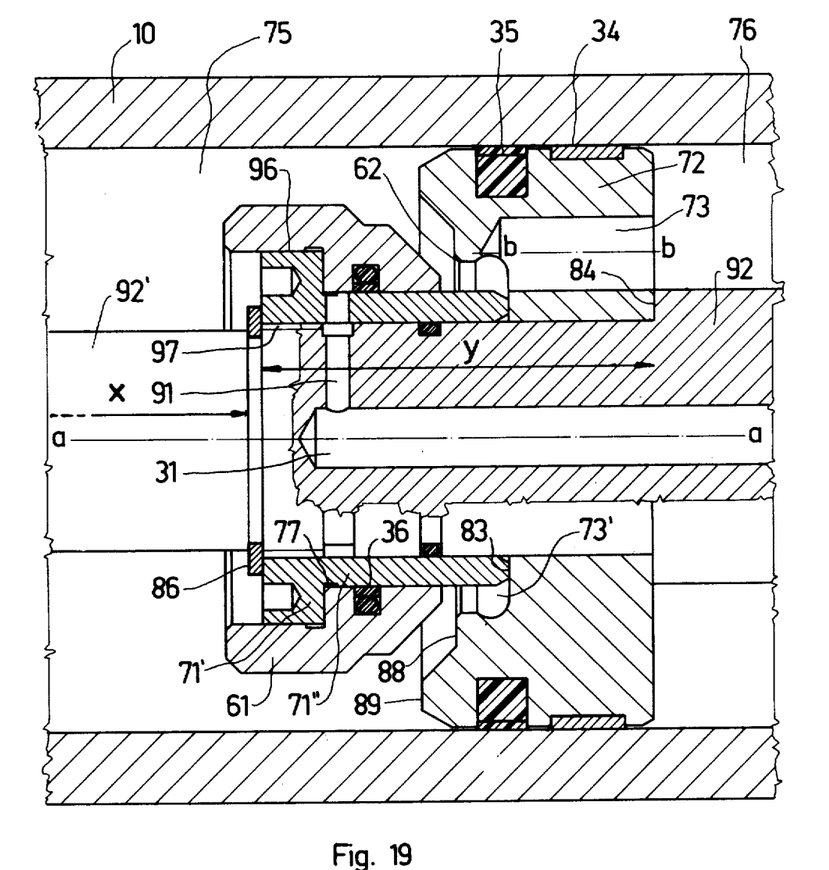
FIG. 19 shows at an enlarged scale a main piston and valve assembly similar to those shown in FIG. 18.

A different type of die closing unit is shown in FIGS. 18 and 19, where the movable die plate is pushed against the stationary die plate in a so-called "push-type" die closing unit. Unlike the pull-type die closing unit, where at least two power cylinders are necessary, the push-type die closing unit can operate with a single power cylinder, if appropriate guides are provided between the die halves 13 and/or the die plates of the die closing unit. FIG. 18 shows the power piston and bypass valve configuration to be essentially the same as in the last-described embodiment (FIGS. 13–17), except that the valve is arranged at a larger diameter, with the fixed ring 71' having a tubular axial extension 83 reaching against the power piston 72. The fixed ring 71' thus can serve a dual purpose, by clamping the power piston 72 against a clamping shoulder 84 of the piston rod 16 (FIG. 19) - or, alternatively, against a split ring while serving as a guide for the valve plunger 61 on two concentric cylindrical surfaces and thereby defining the valve plunger pressure space between these two parts. The fixed ring 71' and the corresponding length portion of the piston rod 92 are preferably provided with threads 97, so that the ring 71' can be axially tightened against the power piston 72. The fully tightened ring 71' is lastly secured in place by means of a retaining ring 86 seated in a groove of the piston rod 92.

A very favorable bypass flow path is obtained in the configuration of FIG. 19, where the smaller guide diameter of the fixed ring 71' is approximately aligned with the diameter of the piston rod 92 on the low pressure side of the power piston 72 and the axially oriented bypass channels 73 in the piston have their innermost wall portion likewise located in alignment with the aforementioned diameters of the ring 71' and rod 92. The flow path of the hydraulic fluid through the power piston 72 thus has a virtually straight inner contour, until it reaches the valve plunger 61, where a 45° outward deviation takes place. The center circle at which the axes b—b of the bypass channels 73 approximately coincides with the diameter of the axial recess 73' of the power piston 72 and the valve seat 62 has approximately the same diameter. Lastly, the outer diameter of the fixed ring 71', which determines the outer guide surface between the valve plunger 61 and the ring 71', is likewise approximately the same as the diameter of the valve seat 62, or it may be somewhat larger, as will be explained further below. The power piston 72 itself has a planar inner clamping face 83 for clamping contact with the extension 72' of ring 71'; axially offset outer planar faces 88 and 89, with a tapered intermediate face portion provide a smooth flow path for the hydraulic fluid into and out of the bypass channels 73. On the outer periphery of the power piston 72 are two annular grooves, one of them accommodating a thin guide sleeve 34, and the other holding a piston seal 35.

It will be noted that, when the diameter of the valve seat 62 and the outer diameter of the ring 71', defining a cylinder surface 96, are identical, a pressurization of the high pressure cylinder space 75 does not automatically retract the valve plunger 61 from its closed position on the valve seat 62. However, because the high pressure space 75 has a larger effective area than the low pressure space 76 behind the power piston 72, a pressurization of both spaces will move the power piston to the right in FIG. 19, i.e. in the direction of die closing. This also means, however, that the valve plunger 61 receives additional opening pressure from the low pressure side of the power piston, on its area which is located inside the valve seat 62. This additional pressure and the impingement of the fluid flow through the bypass channels 73 against the plunger 61 will maintain the latter in its open position, until the valve plunger pressure space 77 is pressurized via the channels 31 and 91. As soon as the valve is thus closed, the power cylinder space 75 can be fully pressurized to produce the closing pressure.

In FIG. 18 is shown an auxiliary opening cylinder 96 which is coaxially attached to the power cylinder of the cylinder mount 10. This auxiliary opening cylinder is basically similar in design to the opening cylinders of the pull-type embodiments of FIGS. 1 and 13, having a piston 94 attached to the far extremity of the piston rod portion 92'. Pressurization of this cylinder causes the movable assembly to travel to the left in FIG. 18, until it reaches the fully open position shown in that figure.

Certain types of molding dies and raw materials may require considerable forces for the initial separation of the die halves. In such a case, the valve plunger pressure space 77 is maintained under pressure during the initial portion of the opening stroke, while the low pressure side of the power cylinder is pressurized, in order to create an opening force on the power piston 72 itself. This force is then transmitted to the piston rod 92 through the fixed ring 71' and the thread connection 97. Following the initial separation of the die halves, the pressure space 77 can be de-pressurized, whereupon the valve plunger 61 opens under the pressure exerted against it through the fluid in the recess 73' which is in communication with the low pressure space 76 of the power cylinder. The full force potential, e.g. 20 tons, which is available for the creation of a closing pressure on the die halves can thus also be utilized for the initial opening travel, the auxiliary opening cylinder producing the remainder of the opening travel in an accelerated motion.

For the closing travel, the power piston 72 itself acts as a differential-diameter piston, because the low pressure space 76 is smaller in effective area than the high pressure space 75. This is due to the fact that the diameter of the piston rod 92 is larger than the diameter of the piston rod portion 92' reaching into the auxiliary opening cylinder. Thus, if both power cylinder spaces are pressurized evenly, with the bypass channels 73, open, an effective piston area equal to the difference between the two piston rod cross sections is obtained under this pressure, producing an accelerated closing travel motion. The diameter of the piston rod 92 is preferably equal to the inner diameter of the auxiliary cylinder, with the result that identical effective piston areas are available for both the opening and closing travel.

In order to obtain an automatic opening motion on the valve plunger 61 under the effect of the pressurization of the high pressure space 75, as soon as the pressure in the valve plunger pressure space 77 is relaxed, the outer diameter of the pressure space 77, i.e. the outer diameter of the fixed ring 71', may be chosen somewhat larger than the diameter of the valve seat 62, meaning that the valve plunger has a larger effective area subjected to the pressure of pressure space 75 in the direction of opening motion, viz. the area located outside the valve seat 62, than the area which is subjected to the same pressure in the direction of closing motion. Once the valve plunger is thus retracted into its open position, the high pressure space 75 is in communication with the low pressure space 76. But even in this condition, a certain closing pressure can be maintained through the differential-piston effect of the power cylinder. Removal of the pressure from the power cylinder spaces 75 and 76 and pressurization of the auxiliary piston space 93 causes the assembly to execute the accelerated opening travel. It follows that, because this opening travel, as well as the closing travel, are produced with relatively small effective piston areas, they can be executed very rapidly, without the need for a large pumping capacity.

As can readily be seen from FIGS. 18 and 19, the fixed ring 71', with its extension 71'', and the hollow valve plunger 61 form a convenient sub-assembly which is readily removable from the piston rod. The valve plunger no longer needs to have a sliding fit on the piston rod itself. Also, because the piston rod diameter in the rod portion which carries the power piston 72 and the fixed ring 71' is greater by the height of the thread connection 97, these parts are easier to slide in place on the piston rod. A gasket 36 between the valve plunger 61 and the ring extension 71'' serves as a seal for the pressure space 77, similar gaskets being provided in all other embodiments. The power piston itself is again equipped with a guide sleeve 34 and a piston seal 35.

The construction of the power cylinder as a differential pressure cylinder has the additional advantage of providing unequal capacities in its high pressure and low pressure spaces 75 and 76, respectively. This means that, during each operating cycle, a portion of the hydraulic fluid contained in the power cylinder is evacuated during the opening stroke and fresh hydraulic fluid is re-introduced during the subsequent closing stroke. The hydraulic fluid thus removed is passed through the cooling circuit of the injection molding machine, while cooled fluid enters the power cylinder. This feature prevents an undesirable heat buildup in the power cylinders of the die closing unit.

The embodiments of FIGS. 13–17 and of FIGS. 18 and 19 have the additional advantage of being more compact in the axial direction than the embodiment of FIGS. 8–12. This makes it possible to obtain a longer opening stroke with a given length of the power cylinder, or to correspondingly shorten the power cylinder for a given opening stroke. The fact that the power piston 72 is axially clamped against the shoulder 84 of the piston rod 92 further makes it possible to considerably reduce the axial length of the power piston, thereby accordingly shortening the length of the bypass channels 73 and thus reducing the flow resistance therethrough during opening and closing travel. The reduction of this flow resistance, in turn, makes possible a corresponding increase in the speed of opening and closing travel. The combined features of the higher flow speed through the power piston and the much smaller weight of the moving part of the power piston valve thus make it possible to greatly increase the operating speed of this closing unit, thereby correspondingly shortening the duration of an injection molding cycle, for a higher productivity of the injection molding machine.

A preferred differential ratio for the piston rod diameters at the rod portions 92 and 92' is 15 to 12. As stated earlier, this same ratio is preferably also maintained with respect to the diameters of the auxiliary piston 94 and the associated piston rod portion 92', in order to obtain identical opening and closing travel conditions.

It should be understood, of course, that the foregoing disclosure described only preferred embodiments of the invention and that it is intended to cover all changes and modifications of these examples of the invention which fall within the scope of the appended claims.

I claim the following:

1. In a hydraulic linear actuator of the cylinder and piston type, whose motion is switchable from a travel mode in which a movable assembly is advanced or retracted at accelerated speed and with comparatively little force to a power mode in which the assembly is subjected to a greatly increased pressure, when the piston is at or near one end of its travel stroke, which actuator is advantageously applicable as a drive for the die closing unit of an injection molding machine, the combination comprising:

a closed power cylinder with hydraulic connections at both extremities for double-acting operation;

a power piston fixedly seated on a piston rod and arranged for longitudinal travel inside said cylinder over the length of a piston stroke; the piston rod having a forward rod portion extending from the forward end of the power cylinder, which rod portion is connected to a movable assembly arranged for travel between an open position on one end of the piston stroke and a closed position on the other end of the stroke, and a rear rod portion extending from the opposite end of the power cylinder; and the power piston further dividing the space of the power cylinder into a high pressure space on that side of the piston which needs to be pressurized to urge the movable assembly into its closed position and a low pressure space on the opposite side of the piston;

a plurality of bypass channels extending generally axially across the body of the power piston from the high pressure side thereof to the low pressure side;

an annular valve seat on the power piston, on its high pressure side, arranged so as to surround the openings of the bypass channels;

a hollow valve plunger sealingly surrounding a cylindrical guide surface on the piston rod on the high pressure side of the power piston, said plunger being guided for axial motion toward and away from the power piston, between a closed position in which a shoulder of the valve plunger sealingly abuts against the valve seat and an open position located a distance away from said seat, and the valve plunger has at least one axial end face exposed to the fluid in the high pressure space;

means for moving the valve plunger between its open and closed positions in response to fluid pressure; and an auxiliary cylinder cooperating with the rear piston rod portion so as to define a coaxial auxiliary linear actuator capable of driving the same movable assembly via the piston rod; and wherein:

the auxiliary cylinder has a much smaller hydraulically effective cross section than the power cylinder, so that, when the auxiliary cylinder is supplied with pressurized fluid while the valve plunger is in its open position, the piston rod and the movable assembly travel at a comparatively high rate of speed, while the power piston moves through the fluid contained inside the power cylinder, as the latter passes through its bypass channels from side to side of the power piston.

2. A hydraulic linear actuator combination as defined in claim 1, wherein:

the movable assembly is in its closed position when the power piston has reached the rear end of its stroke;

the high pressure space in the power cylinder is that portion of the cylinder space which is located forward of the power piston; and the pressurization of the high pressure space, with the power piston bypass channels closed, causes the piston rod to pull the movable assembly toward its closed position.

3. A hydraulic linear actuator combination as defined in claim 1, wherein:

the movable assembly is in its closed position when the power piston has reached the forward end of its stroke;

the high pressure space in the power cylinder is that portion of the cylinder space which is located to the rear of the power piston; and the pressurization of the high pressure space, with the power piston bypass channels closed, causes the piston rod to push the movable assembly toward its closed position.

4. A hydraulic linear actuator combination as defined in claim 1, wherein:

the rear portion of the piston rod has a larger diameter than its forward portion, so that the power piston operates as a differential piston which, when the power piston bypass channels are open and both pressure spaces in the power cylinder are evenly pressurized, moves to the rear, together with the movable assembly, as a result of the larger effective area of the forwardly located pressure space; and the rear portion of the piston rod projects freely into the auxiliary cylinder so as to define a pressure space therein to which the rear extremity of the piston rod is exposed and which, when pressurized while the power piston bypass channels are open, causes the piston rod and the movable assembly to travel to the fore.

5. A hydraulic linear actuator combination as defined in claim 4, wherein
the difference in the effective areas of the power cylinder pressure spaces is approximately equal to the effective cross-sectional area of the rear portion of the piston rod.

6. A hydraulic linear actuator combination as defined in claim 1, wherein:
the rear portion of the piston rod has a smaller diameter than its forward portion, so that the power piston operates as a differential piston which, when the power piston bypass channels are open and both pressure spaces in the power cylinder are evenly pressurized, moves to the fore, as a result of the larger effective area of the rearwardly located pressure space; and
the piston rod carries on the rear extremity of its rear piston rod portion an auxiliary piston engaging the wall of the associated auxiliary cylinder so as to define a pressure space forward of the auxiliary piston which, when pressurized while the power piston bypass channels are open, causes the piston rod and the movable assembly to travel to the rear.

7. A hydraulic linear actuator combination as defined in claim 6, wherein
the forward portion of the piston rod has approximately the same diameter as the auxiliary piston on its rear extremity.

8. A hydraulic linear actuator combination as defined in claim 1, further comprising:
at least one additional parallelly spaced power cylinder with a substantially identical power piston, piston rod, piston bypass channels, valve seat, cooperating valve plunger with valve plunger moving means, and coaxial auxiliary cylinder; and wherein the forward portions of the piston rods are connected to the same movable assembly;
a first one of the piston rods carries on the rear extremity of its rear piston rod portion an auxiliary piston engaging the wall of the associated auxiliary cylinder so as to define a pressure space forward of the auxiliary piston which, when pressurized while the power piston bypass channels are open, causes this piston rod, the movable assembly, and the other piston rod to travel to the rear; and
a second one of the piston rods has its rear piston rod portion freely projecting into the associated auxiliary cylinder so as to define a pressure space therein to which the rear extremity of the piston rod is exposed and which, when pressurized while the power piston bypass channels are open, causes this piston rod, the movable assembly and the other piston rod to travel to the fore.

9. A hydraulic linear actuator combination as defined in claim 8, wherein
the hydraulically effective cross-sectional areas of the aforementioned two pressure spaces are substantially identical in size, which latter is a fraction of the hydraulically effective cross-sectional area of the power piston, when its bypass channels are blocked by the valve plunger.

10. A hydraulic linear actuator combination as defined in claim 1, wherein
the piston rod has the same diameter on its forward portion as on its rear portion, as well as on an intermediate portion on which the power piston is seated; and
the power piston rod further includes an annular groove near the low pressure side of the power piston and a split abutment ring which is seated in this groove and radially protrudes therefrom, said ring serving to transmit axial forces from the piston to the rod, in the sense of urging the movable assembly into its closed position.

11. A hydraulic linear actuator combination as defined in claim 1, wherein:
the power piston further includes an axial recess on its high pressure side located radially inwardly adjacent to its valve seat; and
the bypass channels of the power piston open into this radial recess.

12. A hdyraulic linear actuator combination as defined in claim 11, wherein:
the valve plunger includes a tapered seating face which is oriented outwardly and away from the power piston; and
the valve seat of the power piston has a radially narrower, similarly oriented tapered face.

13. A hydraulic linear actuator combination as defined in claim 1, wherein:
the power piston has a central bore with which it is fixedly seated on the piston rod, over a first length portion of said bore which is located adjacent to the low pressure side;
a second length portion of the power piston bore and the guide surface on the piston rod define together an annular plunger cylinder, the outer wall of said cylinder being defined by the piston bore, and its concentric inner wall being defined by the piston rod, said cylinder space being open to the high pressure space;
the hollow valve plunger has corresponding concentric inner and outer walls in contact with the concentric cylinder walls; and
one axial end of the annular plunger cylinder is closed against the piston rod, thereby defining a valve plunger pressure space at this end of the cylinder as part of said valve plunger moving means, said pressure space being connected to a source of hydraulic pressure, via a channel in the piston rod, so that the valve plunger is moved away from it, when it is pressurized.

14. A hydraulic linear actuator combination as defined in claim 13, wherein:
the annular plunger cylinder is arranged axially inside the valve seat on the power piston;
the valve plunger pressure space is located at the inner end of the plunger cylinder;
a portion of the valve plunger length is sealingly engaged inside the plunger cylinder and thus located axially inside the valve seat; and
the valve plunger shoulder which cooperates with the valve seat is part of an enlarged collar on the non-engaged portion of the valve plunger.

15. A hydraulic linear actuator combination as defined in claim 14, wherein
the valve plunger moving means further includes a compression spring arranged inside the valve plunger pressure space, the spring bearing against the closed end of the latter and against the near extremity of the valve plunger, thereby urging the latter toward its open position.

16. A hydraulic linear actuator combination as defined in claim 13, wherein:
the annular plunger cylinder is arranged axially outside the valve seat on the power piston, the outer wall of said cylinder being larger in diameter than the diameter of the valve seat;
the valve plunger pressure space is located at the outer, i.e. more distant, end of the plunger cylinder, its closed end being constituted by an end cover;
the near end of the plunger cylinder is open to the high pressure space;
the valve plunger is sealingly engaged inside the plunger cylinder between the end cover and the valve seat; and
the valve plunger shoulder which cooperates with the valve seat is part of an end face at the near extremity of the valve plunger.

17. A hydraulic linear actuator combination as defined in claim 1, wherein:
the valve plunger is located axially outside the power piston in the high pressure space of the power cylinder;
the valve plunger shoulder which cooperates with the valve seat is part of a near end face at the near extremity of the valve plunger; and
the valve plunger moving means includes an enclosed valve plunger pressure space to which an opposite, far axial face of the valve plunger is exposed, the pressure space being connected to a source of hydraulic pressure, via a channel in the piston rod, so that, when the pressure space is pressurized, the valve plunger is moved toward the valve seat on the power piston.

18. A hydraulic linear actuator combination as defined in claim 17, wherein
the valve plunger moving means further includes a compression spring arranged inside the valve plunger pressure space, the spring bearing against the piston rod and against the valve plunger, thereby urging the latter toward the valve seat on the power piston.

19. A hydraulic linear actuator combination as defined in claim 17, wherein:
the valve plunger has the shape of a sleeve, with a guide bore, i.e. an inner cylindrical surface, sealingly engaging the piston rod guide surface and an outer cylindrical surface at a diameter which corresponds to the outer diameter of the valve plunger pressure space;
the piston rod includes an annular member having a cylindrical surface adapted for sealing and sliding engagement with the outer cylindrical surface of the valve plunger; and
the valve plunger pressure space is defined between the piston rod and the valve plunger, the annular member of the piston rod including an axial face bordering this pressure space in opposition to the far axial face of the valve plunger.

20. A hydraulic linear actuator combination as defined in claim 19, wherein:
the diameter of the valve seat on the power piston is smaller than the outer diameter of the valve plunger pressure space, so that a pressurization of the high pressure space creates an axial force on the valve plunger in the direction away from the valve seat; and
the inner diameter of the valve plunger pressure space is smaller than the diameter of the valve seat, so that, when the valve plunger is in its closed position and both pressure spaces are evenly pressurized, the valve plunger is maintained in its closed postion.

21. A hydraulic linear actuator combination as defined in claim 20, wherein:
the annular member of the piston rod includes a removable cylinder sleeve, its outer cylindrical surface being that of a cylindrical bore which is open toward the power piston, but closed in the other direction at said axial face which borders the valve plunger pressure space; and
the outer cylindrical surface of the valve plunger engages said bore from the inside.

22. A hydraulic linear actuator combination as defined in claim 20, wherein:
the annular member of the piston rod includes a fixed collar on the piston rod, its outer cylindrical surface being that of a short cylinder;
the outer cylindrical surface of the valve plunger is that of an enlarged cylindrical bore portion in the valve plunger which is open toward the far extremity of the valve plunger and axially adjacent its guide bore; and
the valve plunger surrounds and engages the fixed collar on the piston rod from the outside.

23. A hydraulic linear actuator combination as defined in claim 22, wherein
the annular member of the piston rod is a removable ring having a substantially rectangular cross section.

24. A hydraulic linear actuator combination as defined in claim 22, wherein:
the annular member of the piston rod is removable from the piston rod and has the shape of a flange bushing, the flange part of the member being said fixed collar, and the bushing part of the member being a tubular extension seated on the piston rod and extending toward the power piston; and
the cylindrical guide surface on the piston rod is constituted by the outer surface of the bushing part of the annular member.

25. A hydraulic linear actuator combination as defined in claim 24, wherein:
the piston rod and the annular member have matching male and female threads;
the power piston has a clamping face on the side that faces toward the high pressure space; and
the threaded annular member is adapted to serve as a clamping nut, engaging the clamping face of the power piston when tightened against it.

26. A hydrualic linear actuator combination as defined in claim 25, wherein:
the high pressure space of the power cylinder and the valve plunger are located to the rear of the power piston;
the forward portion of the piston rod is larger in diameter than its rear portion, so that the power piston operates as a differential piston;
the piston rod has a clamping shoulder engaging the forward side of the power piston;
the power piston and the annular member are seated on an intermediate length portion of the piston rod which is larger in diameter than its rear portion by approximately twice the radial height of said male thread, but smaller in diameter than its forward portion, so as to define said clamping shoulder; and the piston rod carries on its rear portion as auxiliary piston of approximately the same diameter as the forward piston rod portion, which piston engages the wall of the associated auxiliary cylinder.

27. A hydraulic linear actuator combination as defined in claim 26, wherein the ratio between the diameter of the rear portion of the piston rod and the diameter of the auxiliary piston is approximately 15 to 12.

28. A hydraulic linear actuator combination as defined in claim 25, wherein:

the outer diameter of the bushing part of the annular member is approximately equal to the diameter of the forward piston rod portion;

the power piston further includes an axial recess in its rear side radially inwardly adjacent to its valve seat;

the bypass channels in the power piston are bores oriented in parallel to the piston rod axis and extending from the foward side of the piston to said recess, the bores being arranged on a center circle whose diameter is approximately equal to the outer diameter of the valve plunger pressure space and a small amount larger than the diameter of the valve seat; and the bypass channels are bores of a diameter that is approximately equal to the difference between the diameter of their center circle and the diameter of the forward piston rod portion.

29. A hydraulic linear actutor combination as defined in claim 28, wherein:

the valve plunger further includes a tapered seating face which is oriented at approximately 45° outwardly and away from the power piston;

the valve seat has a radially much narrower, similarly oriented tapered face; and the power piston further includes a narrow planar rear face radially outwardly adjacent its valve seat, and a tapered face continuing radially outwardly from the latter in parallel to the tapered seating face of the valve plunger, so as to define a parallel-tapered flow gap therebetween.

* * * * *